INVENTORS
SAMUEL E. BLUM
LUTHER M. FOSTER
KWANG K. SHIH
JERRY M. WOODALL
BY Harold L. McGee
ATTORNEY June 15, 1971 S. E. BLUM ET AL 3,585,087

METHOD OF PREPARING GREEN-EMITTING GALLIUM PHOSPHIDE DIODES BY EPITAXIAL SOLUTION GROWTH

Filed Nov. 22, 1967 3 Sheets-Sheet 3

United States Patent Office 3,585,087

Patented June 15, 1971

3,585,087

METHOD OF PREPARING GREEN-EMITTING GALLIUM PHOSPHIDE DIODES BY EPITAXIAL SOLUTION GROWTH

Samuel E. Blum, Bronx, Luther M. Foster, Chappaqua, Kwang K. Shih, Yorktown Heights, and Jerry M. Woodall, White Plains, N.Y., assignors to International Business Machines Corporation, Armonk, N.Y.

Filed Nov. 22, 1967, Ser. No. 685,090

Int. Cl. H01l 7/46, 7/38, 7/00

U.S. Cl. 148—171 8 Claims

ABSTRACT OF THE DISCLOSURE

Green-emitting electroluminescent gallium phosphide diodes are grown by liquid phase epitaxy. A Ga-GaP melt contained in a covered crucible is placed in a vertical furnace. A GaP substrate wafer is inserted into the melt which has been maintained at a temperature of about 1110–1140° C. An n-type GaP layer is produced by the addition of a dopant selected from S, Se, and Te to the melt which is slowly cooled to a temperature of about 1070–1100° C., at which time the melt is counterdoped with an acceptor dopant, e.g., Zn or Cd. The melt is further cooled to about 1030–1060° C., causing the growth of a p-type layer, after which the substrate is removed from the melt and further cooled to ambient temperatures. Electroluminescent diodes are then prepared by thinning the substrate side of the wafer to reduce series resistance. Au-Zn and Au-Sn alloy dots are applied to the p and n side, respectively, of sawed or cleaved sections of the wafer.

Green-emitting diodes prepared by the above method have efficiencies of about $2.7\times10^{-4}$, which efficiencies can be improved by a factor of 2 or more by coating the diodes with anti-reflective epoxy coatings. The diodes find utility as panel indicators.

BACKGROUND OF THE INVENTION

Green light emitting gallium phosphide diodes have been prepared in the past by nonequilibrium growth processes, (L. M. Foster and M. Pilkuhn, Applied Physics Letters, 7, 65 (1965); L. M. Foster, T. S. Plaskett and J. E. Scardefield, IBM Journal of Research and Development 10, 114 (1966); M. Pilkuhn and L. M. Foster, IBM Journal of Research and Development 10, 122 (1966); and U.S. Pat. application Ser. No. 475,541 to L. M. Foster et al., assigned to the same assignee as is this application). The prior methods employ various procedures for growing single crystal platelets of GaP that have been produced by precipitation from a zinc and sulfur, selenium or tellurium doped dilute solution of gallium phosphide dissolved in gallium. "Built in" p-n junctions are formed as a result of the difference in segregation between donor and acceptor impurities. The crystal platelets so produced are nonuniform in size and morphology and have a considerable gradient of dopant concentration from the surface to the interior of each platelet. The above limitations are the result of the erratic nature of nucleation and crystallization of the doped GaP platelet from supersaturated dilute solutions. For high efficiency electroluminescence in the green region of the spectrum, the acceptor and donor concentrations in the p-type region immediately adjacent to the junction are extremely critical, since it is from this region that the emission originates.

This critical concentration cannot be achieved in a reproducible manner when the solution grown platelets are used because of their irregular size and morphology and because of wide variations in dopant concentration throughout the platelets.

Additionally, in the above stated prior art methods it is also necessary to carefully exclude oxygen during the preparation of green-emitting diodes, since oxygen produces red light emission and diminishes green light emission.

In the past, only red-emitting GaP diodes have been prepared by liquid phase epitaxy, (patent application Ser. No. 603,373 to Leonard V. Buszko et al., assigned to the same assignee as the present application). GaP doubly doped with Zn and O is grown on an n-type GaP substrate from a gallium rich Ga-GaP melt in a sealed vessel to suppress material transport via the vapor phase. While the method produces highly efficient red-emitting diodes, there is no indication that green-emitting diodes may similarly be prepared. It appears, therefore, that a method for producing diodes which emit in the green region of the visible spectrum at very high efficiencies would be most desirable and useful.

SUMMARY OF THE INVENTION

According to an aspect of this invention, there is provided a method for preparing green light emitting GaP diodes by liquid phase epitaxy. A GaP substrate wafer is inserted in a donor doped, Ga rich Ga-GaP melt which is contained in a vessel placed at the base of a vertical furnace, such as shown and described in patent application Ser. No. 646,315 to Hans S. Rupprecht and Jerry M. Woodall and assigned to the same assignee as is the present application. The Ga-GaP melt containing vessel of the present invention is covered to prevent the evaporation of dopants from the melt during crystal growth, a feature not shown or described in the above mentioned application Ser. No. 646,315, but which is an important requirement of this invention. The covering of the crucible during crystal growth causes the dopant vapors to be confined to the area just over the melt, rather than being swept away with a flushing inert gas. This maintains the concentration of the dopants at a desired level in the resultant crystal. As the melt is cooled slowly, an n-type layer is epitaxially grown on the GaP substrate. An acceptor dopant is then added to the melt. Cooling of the melt is continued to further epitaxially grow a p-type layer onto said n-type layer. After the deposition of the p-type layer, the wafer and its overgrowth are removed from the furnace and cleaned of excess gallium. The wafer is then lapped to desired thickness and smoothness. Ohmic contacts are applied to both faces, either before or after cutting to the desired shape and size. Examples of contact material would be Au-Sn alloy for the n-side and Au-Zn for the p-side. The finished diode is mounted in a holder or support such that current can be passed across the p-n junction.

Diodes emitting in the green region of the visible spectrum are produced by the method of this invention which have efficiencies of $2.7\times10^{-4}$, as compared to $1.5\times10^{-4}$ for similar diodes produced by prior art methods. The efficiency of diodes of this invention is improved by a factor of two when they are coated with anti-reflective epoxy coatings. Additionally, no special care need be taken in the method of this invention to exclude oxygen. Further, the present method can reproducibly produce green-emitting diodes, thus lends itself to batch production of the same.

According to another aspect of this invention, there is provided an apparatus for growing semiconductor crystal compounds by liquid phase epitaxy. Referring to FIG. 1, quartz chamber 10 is provided within which preparation of the crystal is obtained. Orifice 12 is the inlet for a high purity inert gas used during the steps of the procedure according to this invention. After having served its intended purpose during the steps of the procedure of this invention, the inert gas introduced via orifice 12 exits from chamber 10 via orifice 14. A crucible 16 fitted with an enclosing lid member 17 is established within chamber 10. Contained in the crucible 16 is liquid Ga–GaP 18. The heat source whereby the liquid 18 is raised in temperature and the heat sink whereby the temperature of liquid 18 is lowered are not shown. For convenience a vertical tubular electric furnace with temperature control can be used for both the heat source and heat sink, and the ambient environment providing sufficient temperature for cooling. Quartz tube 20 is introduced into chamber 10 via orifice 22. Removable cap 24 is placed on top of tube 20. Tube 20 is connected by coupling 25 to a graphite piece 26 which has a tube portion 28 therein connecting to the tube portion of tube 20. Orifice 30 of tube 28 exits just above the surface of liquid 18. Graphite portion 26 is machined to have a lower extending portion 32 upon which a solid substrate, e.g., single crystalline GaP layer 34 is affixed by the thrust of screw 36.

Crucible 16 is made from a material which does not react with the components of liquid 18 at the temperature of growth of the crystalline compound according to the practice of the invention. Alumina crucibles have been found suitable for the purposes at hand.

Sutiable inert gases for gas 11 are argon, helium and forming gas (10% $H_2$+90% $N_2$). A suitable pressure of gas 11 introduced at orifice 12 is maintained in chamber 10 to inhibit vapor formation of highly volatile components in liquid 18 and to preclude any undesirable reactions in liquid 18 with contaminants that might otherwise be introduced into chamber 10.

Thus, it is an object of this invention to provide very efficient green light-emitting GaP diodes.

Another object of this invention is to provide a method of reproducibly producing green light-emitting GaP diodes that will enhance uniformity of characteristics of such diodes.

Yet another object of this invention is to provide an improved apparatus for the liquid phase epitaxial growth of semiconductor materials.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
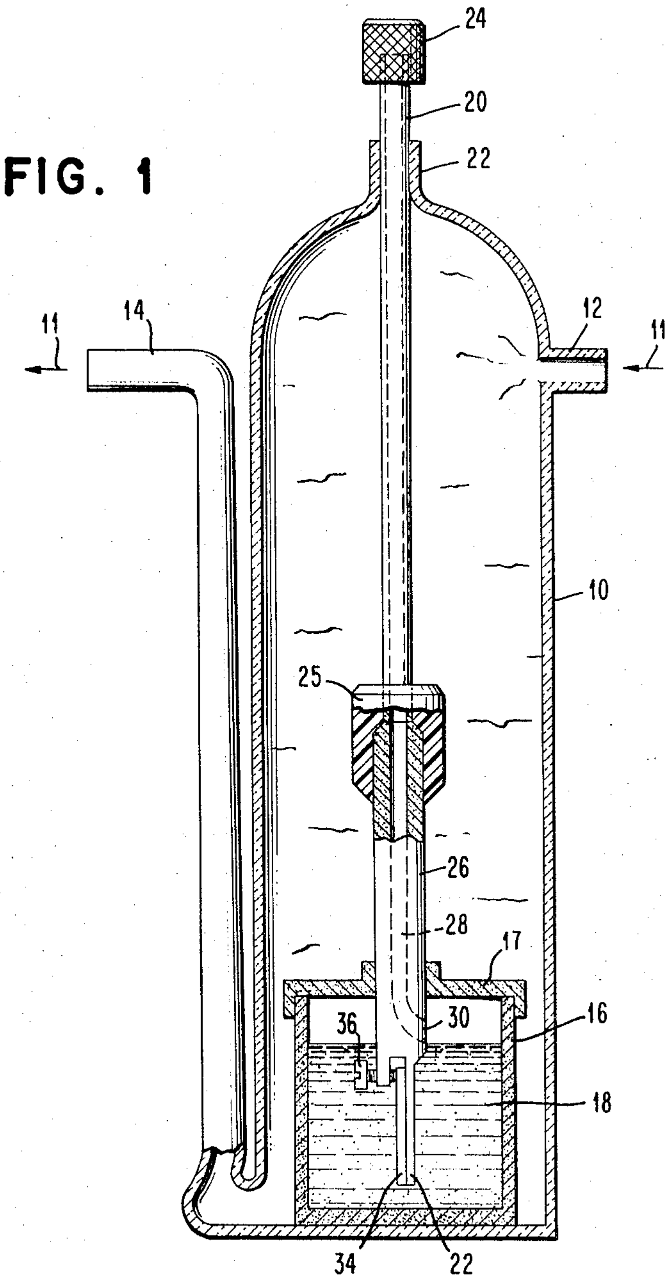
FIG. 1 is a sectional view of an apparatus useful for effecting crystal growth by liquid phase epitaxy of semiconductor compounds.

In operation crucible 16 (FIG. 1) is loaded with Ga and GaP in a ratio of about 7:1. For sake of illustration, 20 grams of Ga and 2.5 to 3 grams of GaP can be used. About 5 milligrams to 10 milligrams of a donor dopant, e.g., Te, is also introduced into crucible 16. Where S and Se are used as the donor dopant, .05 to .1 milligram and .5 to 1 milligram are used respectively. The crucible 16 and its charge together with lid 17 are introduced into chamber 10 through a port not shown. Crucible 16 and its charge is initially heated to a temperature of from about 1110° C. to 1140° C. for a time sufficient to produce liquid 18 which is allowed to come to equilibrium. Equilibrium is reached in about 10 to 15 minutes. Quartz tube 20, and with graphite portion 26 coupled via connection 25, together with an n-type GaP substrate wafer 34 affixed to the extending portion 32 is moved so that substrate 34 is immersed in liquid 18. The GaP substrate 34 is a bulk grown single crystal and can be prepared by standard techniques. Preferably the crystal is produced by a zone-bomb technique such as is described in an article by S. E. Blum and R. J. Chicotka in the IBM Technical Disclosure Bulletin, Vol. 9 No. 12, May 1967. The description shown in the above article is incorporated herein.

N-type GaP is grown on the surface of substrate 34 bl slowly lowering the tempreature of liquid 18 and substrate 34 to a temperature of about 1070° C. to 1100° C. at a rate of about 0.5° C. per minute to 0.25° C. per minute. When the n-type layer has grown to a desired thickness, 50 to 200 milligrams of the acceptor dopant zinc or cadmium in amounts of 500 to 1,000 milligrams is introduced via cap 24 to tube 20, and it falls through orifice 30 into liquid 18. Cooling is continued at the above preselected rate to a temperature of about 1030° C. to 1060° C. The subtsrate 34 with its deposited layers is then removed from the melt. After cooling to room temperature under ambient conditions, the substrate side of the p–n doped wafer is thinned by conventional lapping methods. The wafer is sawed or cleaved into sections of a desired size and electrical contacts are attached, as taught in the above stated application Ser. No. 475,541, to the n and p surfaces of the wafer.

While the invention as illustrated above indicates that the substrate 34 is n-type and an n-type layer is first grown thereon, it should be understood that the reverse order of doping can also be practiced. For example, the substrate 34 may be p-type and the initial crystal growth may be p-type, that is, doped with an acceptor dopant.

Figure 2:
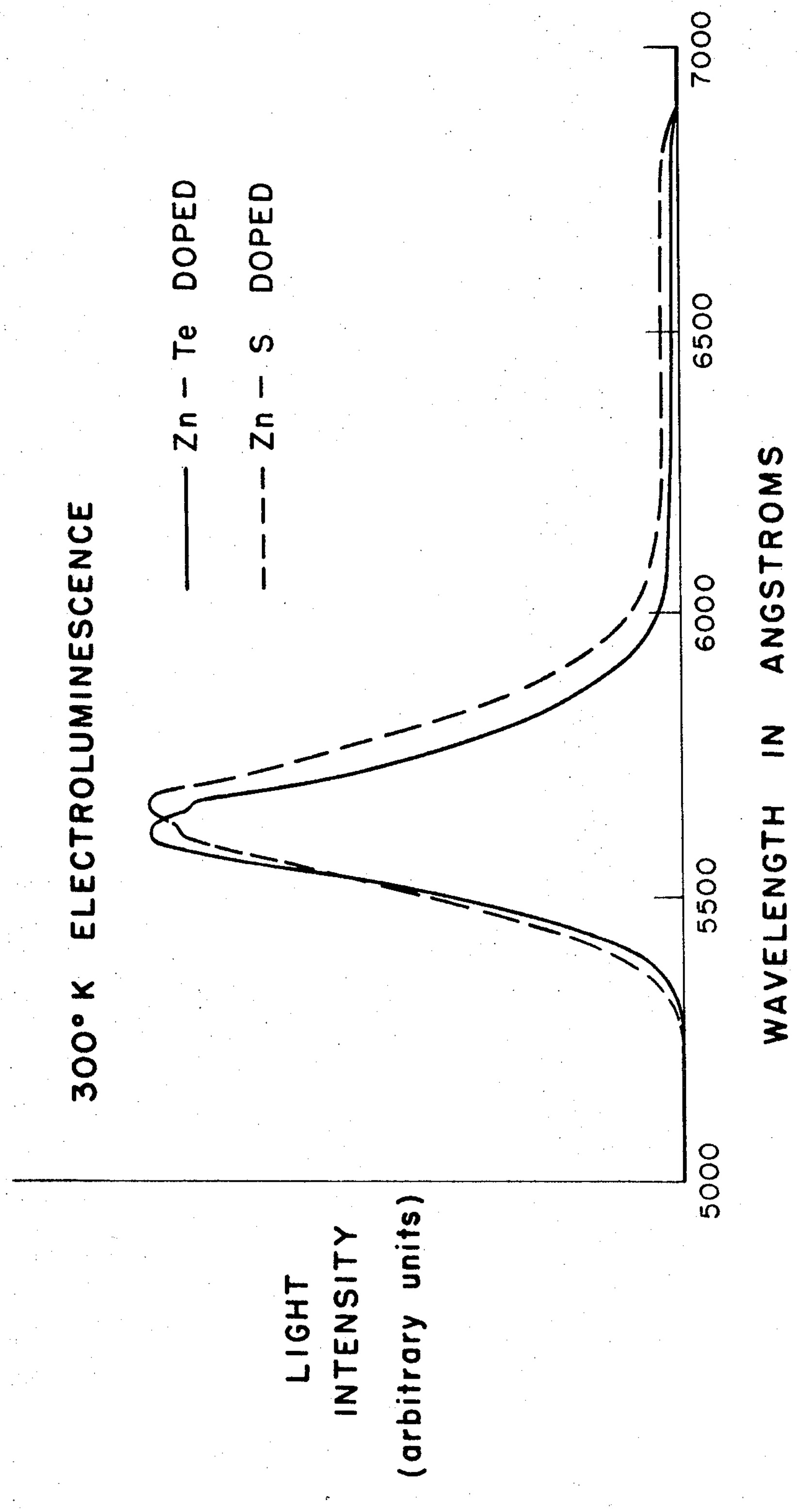
FIG. 2 is a graph illustrating the peak energy of the emission of Zn–S and Zn–Te doped GaP diodes.
Figure 3:
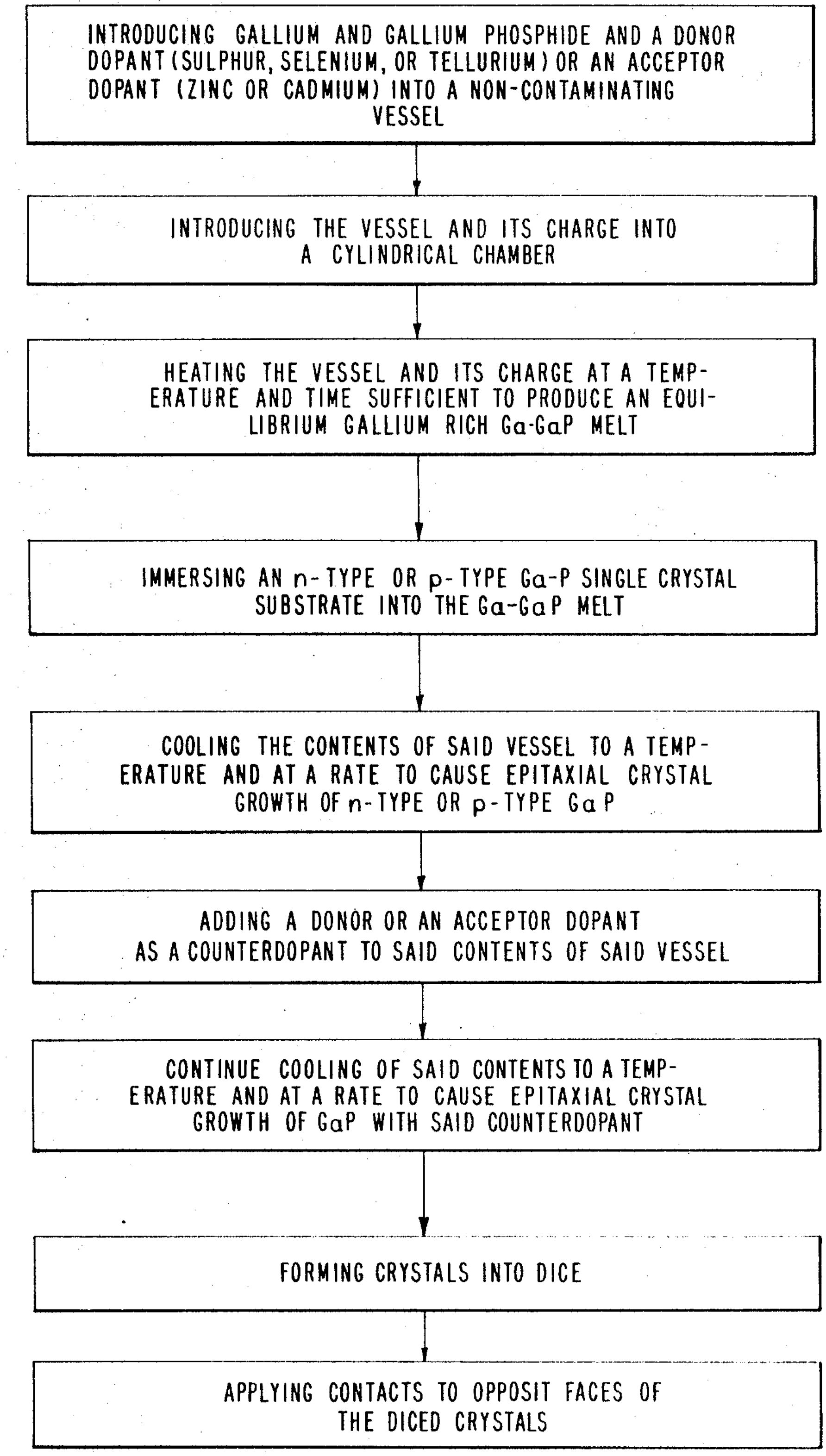
FIG. 3 is a block diagram indicating the steps required in the method of this invention.

Shown in FIG. 2 is the spectral distribution of the electroluminescence from GaP diodes doped with Zn-Te and Sn-S at room temperature. If the donor dopant is sulfur, the emission consists of two peaks, one at about 2.22 ev. and the other at about 2.195 ev.; while if the donor dopant is tellurium, the dominant emission is at about 2.22 ev. with a shoulder at 2.195 ev. The emission at 2.22 ev. may be due to exciton recombination and the emission at 2.195 ev. may be due to a free hole to donor transition.

A comparison of the visibility of the green-emitting diodes of this invention with that of the more common Zn-O doped red-emitting diodes is made by comparing the areas under the two emission peaks, each weighted point for point by the spectral response curve of the eye. The visibility of the green-emitting diodes is seen to equal that of the red-emitting diodes of $1.2\times10^{-2}$ efficiency.

At room temperature the diode current depends upon applied voltage in the following relation:

$$I=I_o \exp\left(\frac{V}{\beta KT}\right)$$

with $\beta$ having values between 1.8 and 2, indicating that recombination occurs in the space-charge region of the diodes. The light intensity is linearly proportional to current even up to several hundred milliamperes. This contrasts with the behavior of Zn-O doped diodes where the red emission begins to saturate at about 30 ma. for the same size diodes. Capacitance measurements indicated that the p-n junctions of the diodes are linearly graded.

In summary, green light-emitting electroluminescent diodes are prepared by liquid phase epitaxy. The diodes have an external quantum efficiency of the order of $2.7\times10^{-4}$. The efficiency was measured without special effort to maximize geometry, reduce internal reflection and the like. If geocetry and reflection losses were minimized, a substantial increase in external emission can be expected. In preparation, a GaP substrate is inserted into a gallium rich melt comprising Ga and GaP together with a dopant. This melt is contained in an inert crucible which is covered during crystal growth so as to cause the vapors of the dopants to be confined within the crucible. When the method is performed without covering the crucible, diodes are produced which emit green light that is only weakly visible to the human eye. The melt is later counter-doped with a second dopant to establish a p-n junction in the growing crystal.

Critical to the invention is the temperature range in which the crystal is grown, viz. between 1150° C. and 1030° C. Also important to the invention is the preselected cooling rates necessary for crystal growth. These rates are between 0.5 C. per minute and 0.25° C. per minute.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid phase epitaxy method of preparing green-emitting gallium phosphide p-n junctions for use in electroluminescent diodes having quantum efficiencies of about $2.7\times10^{-4}$ including the steps of:

(a) heating a mixture comprising Ga, GaP and a first dopant of given conductivity type in a closed vessel, said vessel being established in a furnace, to a temperature of from about 1110° C. to 1140° C. for a time sufficient to provide an equilibrium liquid;

(b) immersing a single crystal GaP wafer substrate having a dopant of the same conductivity type as said first dopant into said vessel and its contents;

(c) cooling the contents of said vessel at a preselected rate from about 0.5° C. per minute to about 0.25° C. to a temperature of from about 1070° C. to 1100° C. to induce liquid phase epitaxial growth of a single crystal layer of GaP having the conductivity type of said first dopant on said substrate;

(d) adding a second dopant of opposite conductivity type as a counterdopant to said first dopant to said vessel and its contents; and (e) further cooling the contents of said vessel at said preselected rate to a temperature of about 1030° C. to 1060° C. to establish a doubly counterdoped epitaxial single crystal layer on said substrate to form a green light emitting p-n junction in a GaP semiconductor structure.

2. A method according to claim 1 wherein said first dopant is a p-type dopant selected from the group consisting of Zn and Cd, and said counterdopant is an n-type dopant selected from the group consisting of S, Se and Te.

3. A method according to claim 1 wherein said first dopant is an n-type dopant selected from the group consisting of S, Se and Te and said counterdopant is a p-type dopant selected from the group consisting of Zn and Cd.

4. A method according to claim 1 wherein said Ga and GaP are present in the ratio of 7 to 1 in said equilibrium liquid.

5. A method according to claim 4 wherein said first dopant is Te and is present in an amount of about 5 milligrams to 10 milligrams in said equilibrium liquid and said second dopant is Zn and is present in an amount of about 50 to 200 milligrams.

6. A method according to claim 5 wherein said first Te dopant is replaced by S, which is present in an amount of about 0.05 milligram to 0.1 milligram.

7. A method according to claim 5 wherein said Te dopant is replaced by Se, which is present in an amount of about .5 milligram to 1 milligram.

8. A method according to claim 5 wherein said Zn dopant is replaced by Cd, which is present in an amount of about 500 milligrams to 1,000 milligrams.

References Cited

UNITED STATES PATENTS

| | | | |
|---|---|---|---|
| 3,278,342 | 10/1966 | John et al. | 148—1.6 |
| 3,411,946 | 11/1966 | Tramposch | 117—201 |
| 3,447,976 | 6/1969 | Faust et al. | 148—1.5 |
| 3,462,320 | 8/1969 | Lynch et al. | 148—171 |

OTHER REFERENCES

Rupprecht, H., "New Aspects of Solution Regrowth in the Device Technology of Gallium Arsenide," in "Proc. of the 1966 Symposium on GaAs in Reading, Editor: Inst. of Physics and Physical Soc., Paper No. 9, 57(1966).

Nelson, H., RCA Review, December 1963 pp. 603–615 (Vol. 24).

Lorenz, N. R. et al., J. of Applied Physics, vol. 37 No. 11, pp. 4094–4102, October 1966.

Starkiewicz et al., "Injection Electroluminescence at p-n Junctions in Zinc-Doped Gallium Phosphide," J. Phys. Chem. Solids 23 pp. 881–4, 1962.

Pilkuhn et al., "Optical and Electrical Properties of Epitaxial and Diffused GaAs Injection Lasers," J. Applied Physics 38, No. 1, pp. 5–10, 1967.

Trumbore et al., "Efficient Electroluminescence in GaP p-n Junctions Grown by Liquid-Phase Epitaxy on Vapor-Grown Substrates," J. Applied Physics 38, No. 4, pp. 1987–8, 1967.

L. DEWAYNE RUTLEDGE, Primary Examiner

W. G. SABA, Assistant Examiner

U.S. Cl. X.R.

23—204, 301; 117—201; 148—1.5, 1.6, 172, 173; 252—62.3